US007929526B2

(12) United States Patent
Kroeger et al.

(10) Patent No.: US 7,929,526 B2
(45) Date of Patent: Apr. 19, 2011

(54) DIRECT MESSAGING IN DISTRIBUTED MEMORY SYSTEMS

(75) Inventors: Robert J. Kroeger, Waterloo (CA); Brian W. O'Krafka, Austin, TX (US); Pranay Koka, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 329 days.

(21) Appl. No.: 11/864,414

(22) Filed: Sep. 28, 2007

(65) Prior Publication Data

US 2009/0086746 A1 Apr. 2, 2009

(51) Int. Cl.
*H04L 12/28* (2006.01)
*H04L 12/56* (2006.01)
*G06F 15/16* (2006.01)
*G06F 9/26* (2006.01)

(52) U.S. Cl. ......... 370/389; 370/412; 709/245; 711/200

(58) Field of Classification Search .................. 370/392, 370/389, 412; 709/245; 711/200
See application file for complete search history.

(56) References Cited

U.S. PATENT DOCUMENTS

| | | | | |
|---|---|---|---|---|
| 5,809,320 | A * | 9/1998 | Jain et al. | 712/34 |
| 2002/0046301 | A1* | 4/2002 | Shannon et al. | 709/328 |
| 2003/0033431 | A1* | 2/2003 | Shinomiya | 709/245 |
| 2005/0044340 | A1* | 2/2005 | Sheets et al. | 711/206 |
| 2006/0214003 | A1* | 9/2006 | Morrow et al. | 235/487 |
| 2008/0056300 | A1* | 3/2008 | Williams | 370/466 |
| 2008/0062866 | A1* | 3/2008 | Jiang et al. | 370/229 |
| 2008/0080491 | A1* | 4/2008 | Saripalli | 370/378 |
| 2008/0095181 | A1* | 4/2008 | Suetsugu et al. | 370/412 |

OTHER PUBLICATIONS

Frank, Matthew I., Vernon, Mary K., A Hybrid Shared Memory/Message Passing Parallel Machine, Computer Sciences Department, University of Wisconsin-Madison, International Conference on Parallel Processing, Aug. 1993, pp. 5.
Heinlein, John, Gharachorloo, Kourosh, Dresser, Scott, Gupta, Anoop, Integration of Message Passing and Shared Memory in the Stanford FLASH Multiprocessor, Computer Systems Laboratory, Stanford University, ASPLOS, Oct. 1994, San Jose, California, pp. 38-50.
von Eicken, Thorsten, Culler, David E., Goldstein, Seth Copen, Schauser, Klaus Erik, Active Messages, a Mechanism for Integrated Communication and Computation, Computer Science Division, EECS, University of California, Berkeley, CA, ACM, 1992, pp. 256-266.

(Continued)

*Primary Examiner* — Jayanti K Patel
*Assistant Examiner* — Saad Hassan
(74) *Attorney, Agent, or Firm* — Marsh Fischmann & Breyfogle LLP; Karl A. Dierenbach; Kent A. Lembke

(57) ABSTRACT

A system and method for sending a cache line of data in a single message is described. An instruction issued by a processor in a multiprocessor system includes an address of a message payload and an address of a destination. Each address is translated to a physical address and sent to a scalability interface associated with the processor and in communication with a system interconnect. Upon translation the payload of the instruction is written to the scalability interface and thereafter communicated to the destination. According to one embodiment, the translation of the payload address is accomplished by the processor while in another embodiment the translation occurs at the scalability interface.

20 Claims, 5 Drawing Sheets

OTHER PUBLICATIONS

Lenoski, Daniel, Laudon, James, Gharachorloo, Kourosh, Gupta, Anoop, Hennessy, John, The Directory-Based Cache Coherence Protocol for the DASH Multiprocessor, Computer Systems Laboratory, Stanford University, CA, IEEE, 1990, pp. 148-159.

Dally, William J., Chao, Linda, Chien, Andrew, Hassoun, Soba, Horwat, Waldemar, Kaplan, Jon, Song, Paul, Totty, Brian, Wills, Scott, Architecture of a Message-Driven Processor, Artificial Intelligence Laboratory and Laboratory for Computer Science, Massachusetts Institute of Technology, Cambridge, MA, ACM, 1987, pp. 337-344.

Agarwal, Anant, Bianchini, Ricardo, Chaiken, David, Johnson, Kirk L., Kranz, David, Kubiatowicz, John, Lim, Beng-Hong, Mackenzie, Kenneth, Yeung, Donald, The MIT Alewife Machine: Architecture and Performance, Laboratory for Computer Science, Massachusetts Institute of Technology, Cambridge, MA, ACM, Santa Margherita Ligure Italy, 1995, pp. 2-13.

Dally, William, J., Fine-Grain Message-Passing Concurrent Computers, Artificial Intelligence Laboratory and Laboratory for Computer Science, Massachusetts Institute of Technology, Cambridge, MA, ACM, 1988, pp. 2-12.

Kuskin, Jeffrey, Ofelt, David, Heinrich, Mark, Heinlein, John, Simoni, Richard, Gharachorloo, Kourosh, Chapin, John, Nakahira, David, Baxter, Joel, Horowitz, Mark, Gupta, Anoop, Rosenblum, Mendel, Hennessy, John, The Stanford FLASH Multiprocessor, Computer Systems Laboratory, Stanford University, Stanford, CA, IEEE, 1994 pp. 302-313.

* cited by examiner

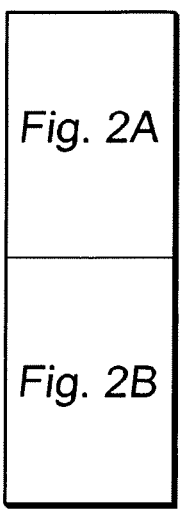
Fig. 2A
Fig. 2B
Fig. 2
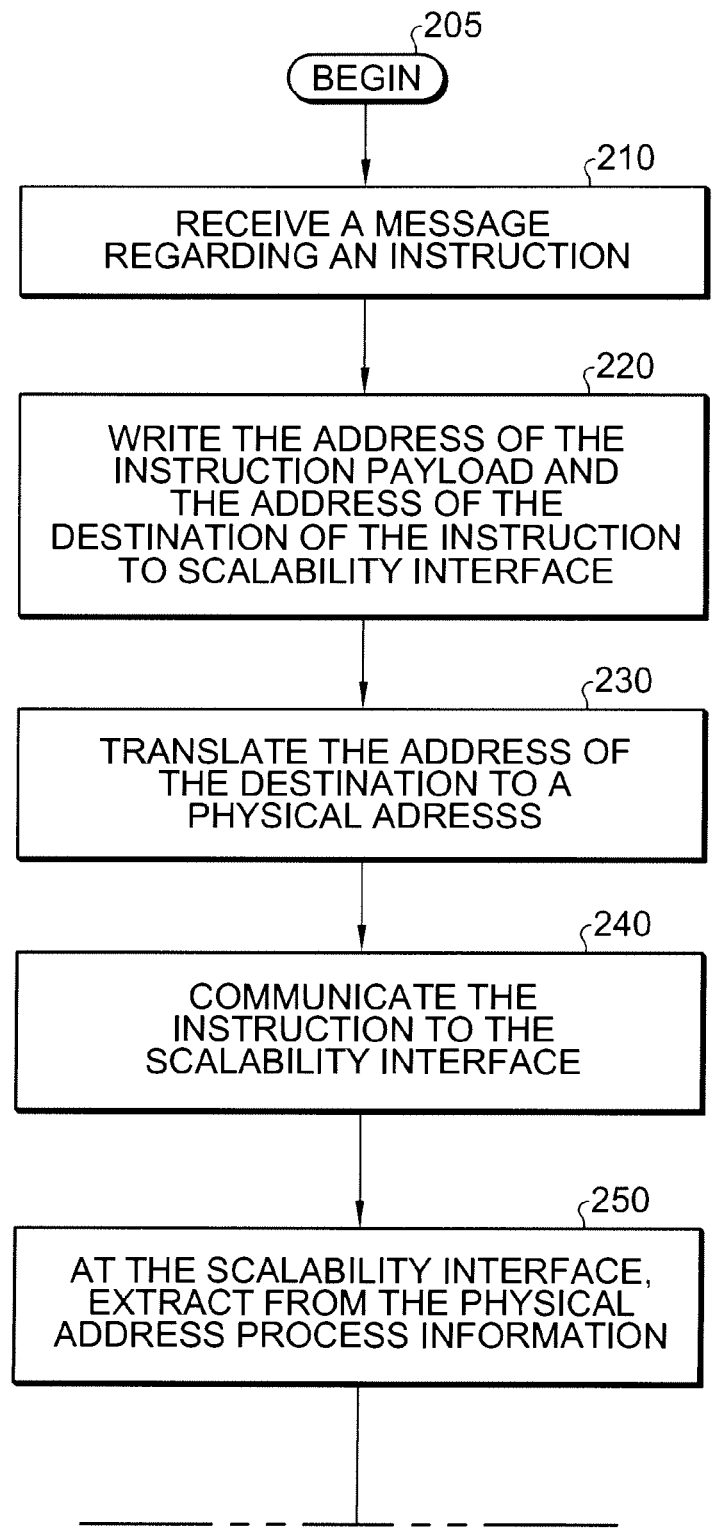
Fig. 2A

DIRECT MESSAGING IN DISTRIBUTED MEMORY SYSTEMS

RELATED APPLICATIONS

This application is related to the subject matter disclosed in U.S. patent application Ser. No. 11/864.507 filed on Sep. 28, 2007 for Hybrid Cache Coherence Using Fine-Grained Hardware Message Passing, co-assigned to Sun Microsystems, Inc., assignee of the present invention, the disclosure of which is herein specifically incorporated by this reference.

BACKGROUND OF THE INVENTION

1. Field of the Invention

Embodiments of the present invention relate, in general, to communication and synchronization between threads in a multiprocessor system and particularly to mechanisms for fine-grained messaging between components of a multiprocessor system using a single instruction.

2. Relevant Background

Parallel computing on clusters of commodity multiprocessors has been gaining more attention in recent years. High-speed general-purpose networks and very powerful commodity multiprocessors are narrowing the performance gap between powerful commodity multiprocessor clusters and supercomputers. Processors in workstation clusters do not generally share physical memory, so all interprocessor communication between processors must be performed by sending messages over the network. Currently, the prevailing programming model for parallel computing on networks of workstations is message passing.

Parallel computing is the simultaneous execution of some combination of multiple instances (threads) of programmed instructions and data on multiple processors in order to obtain results faster. To support parallel (also called multithreaded) applications, multiprocessor systems provide a mechanism for communication and synchronization between the various processes (threads). Fundamentally, there are two mechanisms that provide such a communication and synchronization need. These two mechanisms are message passing and shared memory. The shared memory approach to parallel (multithread) processing utilizes multiple processors accessing a shared or common memory system. The complexity, however, to provide a fully cache-coherent shared memory is high, thus spawning several different approaches to address this need.

The other mechanism is generally known as message passing. Direct messaging is a form of message passing that features asynchronous, one-way messages that are handled by the recipient as soon as possible on receipt in order to minimize system complexity and message transport latency. Direct messaging is efficient, using hardware supported messages that can be sent and received in user mode with very few assembler instructions. By efficient, it's meant that messages as small as a cache line can be sent with high sustained bandwidth on the system interconnect. Direct messaging can be used to communicate a function/command to another processor or they can be used to communicate data. In either case the utility of direct messaging lies in a low-overhead mechanism to send and receive the messages.

This asynchronous form of communication enables pipelining of messages. Since the introduction of direct messaging, numerous implementations of hardware accelerated direct messaging have been proposed. Generally direct message communication is formulated as logically matching request and reply operations. Upon receipt of a request, a request handler is invoked; likewise, when a reply is received, a reply handler is invoked.

Current implementations of direct messaging are however not without their problems. Many current systems are not efficient and perform the discussed communications with high latency and poor sustained bandwidth for small (<64B) messages. Furthermore, current implementation of direct messaging sends content or instructions through multiple messages. For example, an instruction sending data to another destination may involve multiple instances of transferring data from memory to a scalability interface prior to the message being sent. Such multiple messages are subject to system and/or system interrupts resulting in inefficiencies and increased bandwidth demands due to the need to resend interrupted message series. Furthermore, other proposed implementations of direct messages are not compatible with commodity processor designs and instruction sets.

SUMMARY OF THE INVENTION

Briefly stated, embodiments of the present invention convey instructions or data in a multiprocessor system via the passing of a single direct message. According to one embodiment of the present invention a direct message is sent from a processor with a single instruction that writes the address of the message payload and address of the message destination to a scalability interface. According to one embodiment of the present invention a scalability interface extracts destination information from the direct message and places it along with the message payload in an outgoing message queue on that interface. The instruction is thereafter conveyed to the destination via a system interconnect in one transaction.

In one embodiment of the present invention, an application issues a single message using a processor instruction of the form "send <destination_address> <payload_address>". Both <destination_address> and <payload_address> are virtual addresses, that are translated to physical addresses by the normal processor address translation unit. The payload physical address identifies, in one embodiment, the physical location of a cache line containing the payload, which is sent to the scalability interface along with the translated <destination_address>. Embedded within the physical address translation of the destination is process, destination and requesting context information. Using the information, a user-privileged thread in a particular process can directly send (without intervention of the kernel) a complete fine-grained message to a queue on a destination node.

Once at the interface, the information contained within the physical address translation of the destination provides destination information. The process information associated with the user-privileged thread is used to identify and select an outgoing message queue. Once selected, the single cache line is placed in a slot of the queue. Information identifying the destination and destination queue information is also extracted at the scalability interface and recorded in the same slot of the queue as the single cache line. When it reaches the head of the queue, the single line of payload data, along with the destination and queuing information, is assigned a transaction identification number, and placed on the system interconnect as a direct message. Upon receipt of the direct message at the destination, the destination scalability interface sends to the originating scalability interface a receipt acknowledging that the message has arrived. This acknowledgement clears the slot in the outgoing message queue.

In another embodiment of the present invention, an application issues a single message send request, of the form "send <destination_address> <payload_address>", but in this case only the <destination_address> is translated to a physical address by the processor. The message payload is thus not sent directly to the scalability interface. Instead, the send request forwards the virtual <payload_address> to the scalability interface using the translated <destination_address>. As in the previous embodiment, the physical <destination_address> falls within a range of physical addresses that are housed at the scalability interface (all reference to this range of addresses by a processor get routed to the scalability interface). The scalability interface translates the virtual <payload_address> to a physical address, and requests the corresponding cache line on the system interconnect (using, for example, a standard hypertransport data request transaction). The data is then sent to the scalability interface from main memory or processor cache, depending on where the most recent copy resides. Once the data arrives at the scalability interface, the message is handled as previously described.

In many commodity processors this operation can be performed using a non-cacheable store operation in which the <payload_address> is the store data, and <destination_address> is the address where stored. While different from the previous example, this particular embodiment of the present invention remains compatible with existing processors and instruction sets.

One embodiment of the present invention comprises a method for sending a payload from a first node to a second node in a multiprocessor system using a single message. The method begins by receiving from the first node an instruction associated with a instruction address directed to a location associated with a location address. The location address is translated into a physical location wherein the physical location includes process, destination and queue information of the message. Additionally the instruction address is translated to a physical address that is associated with the payload. Thereafter the instruction is written to a scalability interface wherein the writing includes pushing the payload to the scalability interface. The scalability interface extracts from the physical location process information and queues the payload as a direct message in an outgoing message queue. The outgoing message queue is based on the process information. The direct message is sent to the physical location and shortly thereafter communication is received from the location acknowledging receipt of the direct message.

Another method embodiment of the present invention for sending a message in a multiprocessor system begins by receiving an instruction that is associated with a cache line address as well as a location address. The location address translated into a physical location and the physical location includes process, destination and queuing information of the cache line. The instruction is then written to a scalability interface where, from the physical location, process information is extracted. The cache line address is then queued in an outgoing message queue as a direct message based on the extracted process information. Also at the scalability interface, the cache line address translated into a physical address. This translation includes writing a payload associated with the cache line address to the scalability interface. Thereafter the direct message is sent to the physical location via a system interconnect that is communicatively coupled with the location which sends, upon receipt, an acknowledgement of receiving the direct message.

Another aspect of the present invention is a system for sending a message in a multiprocessor system. This system includes a plurality of nodes wherein each node includes at least one processor capable of executing instructions embodied as software, a memory, a cache, and a scalability interface.

The system also includes a system interconnect communicatively coupling each of the plurality of nodes and a translation module that is functionally connected to the at least one processor, cache, memory and scalability interface. Upon receiving a command from the processor having an instruction address associated with an instruction payload and a destination address associated with a destination, the translation module translates the instruction address to an instruction physical address and the destination address to a destination physical address. The instruction payload is then written to the scalability interface and thereafter sent to the destination in a single message.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resorting to the claims being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

Figure 1:
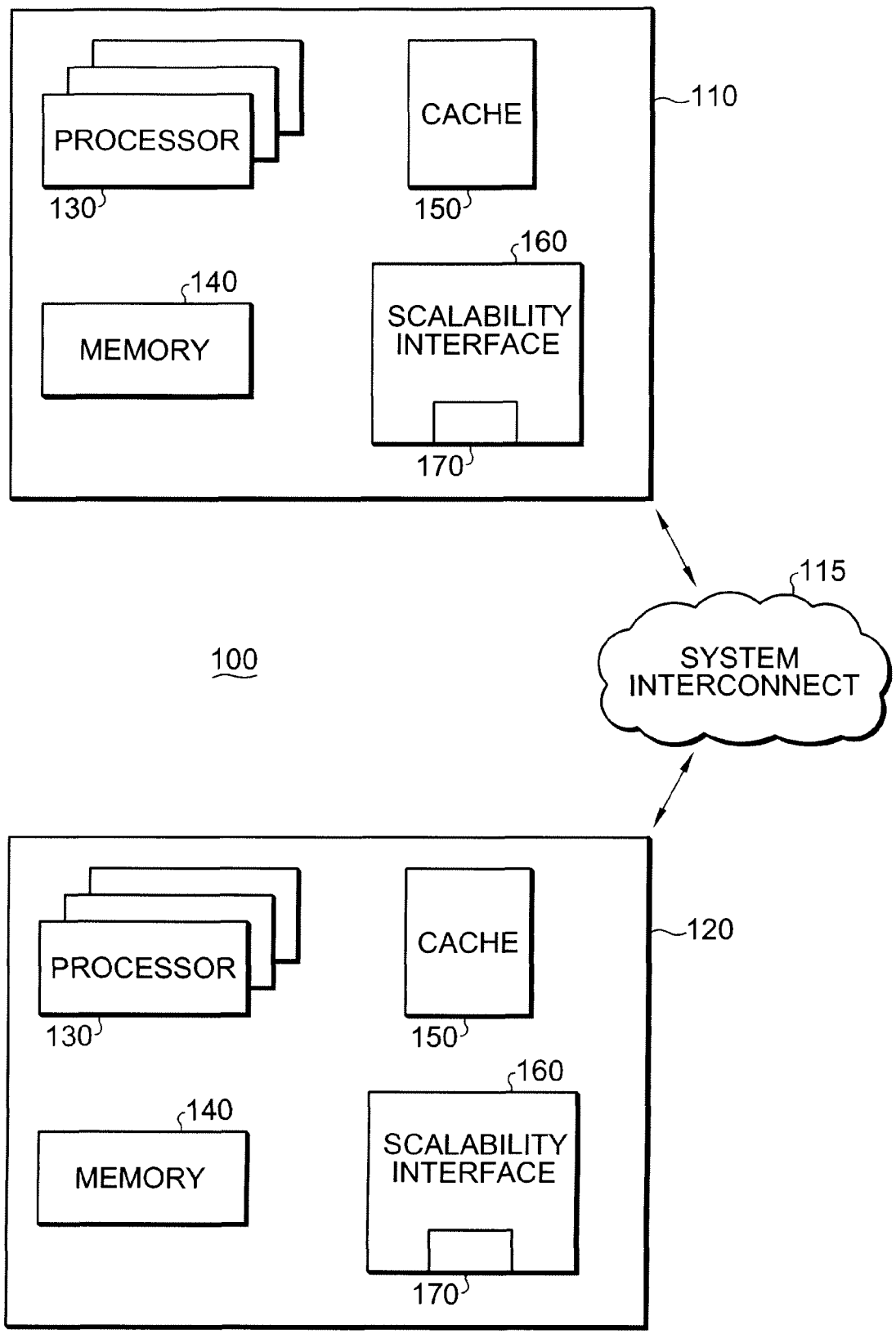
FIG. 1 shows a multiprocessor computer environment in which the present invention is implemented.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Embodiments of the present invention are described herein for the efficient transfer of data from one processor in a multiprocessor computing environment, to another processor in that environment using a single direct message. According to one embodiment of the present invention, a message is sent with a single instruction at the processor of the form "send <destination_address> <payload_address>". Both <destination_address> and <payload_address> are virtual addresses, which, in this embodiment of the present invention, are translated to physical addresses by the processor address translation unit. The payload physical address identifies the physical location in memory of a cache line containing the payload. This payload is thereafter sent to the scalability interface along with the translated <destination_address>. The scalability interface takes the payload, combines it with the destination information, and places it in an outgoing fine grained message queue to be conveyed to the destination via a system interconnect.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

FIG. 1 shows a multiprocessor computer environment in which the present invention can be implemented. As shown, two nodes 110, 120 of a multiprocessor system are communicatively coupled via a system interconnect 115 or interconnect fabric. Each node 110, 120 includes at least one processor 130, a memory 140, cache 150 and a scalability interface 160. Each node also includes a translation module 170 shown in this embodiment of the present invention as part of the scalability interface 160. One skilled in the art will recognize that the functionality and implementation of the translation module, as will be described in detail hereafter, is not limited to that of the scalability interface. Indeed the translation of the instruction's virtual address to a physical location can be implemented by either the scalability interface or the processor itself.

Figure 2B:
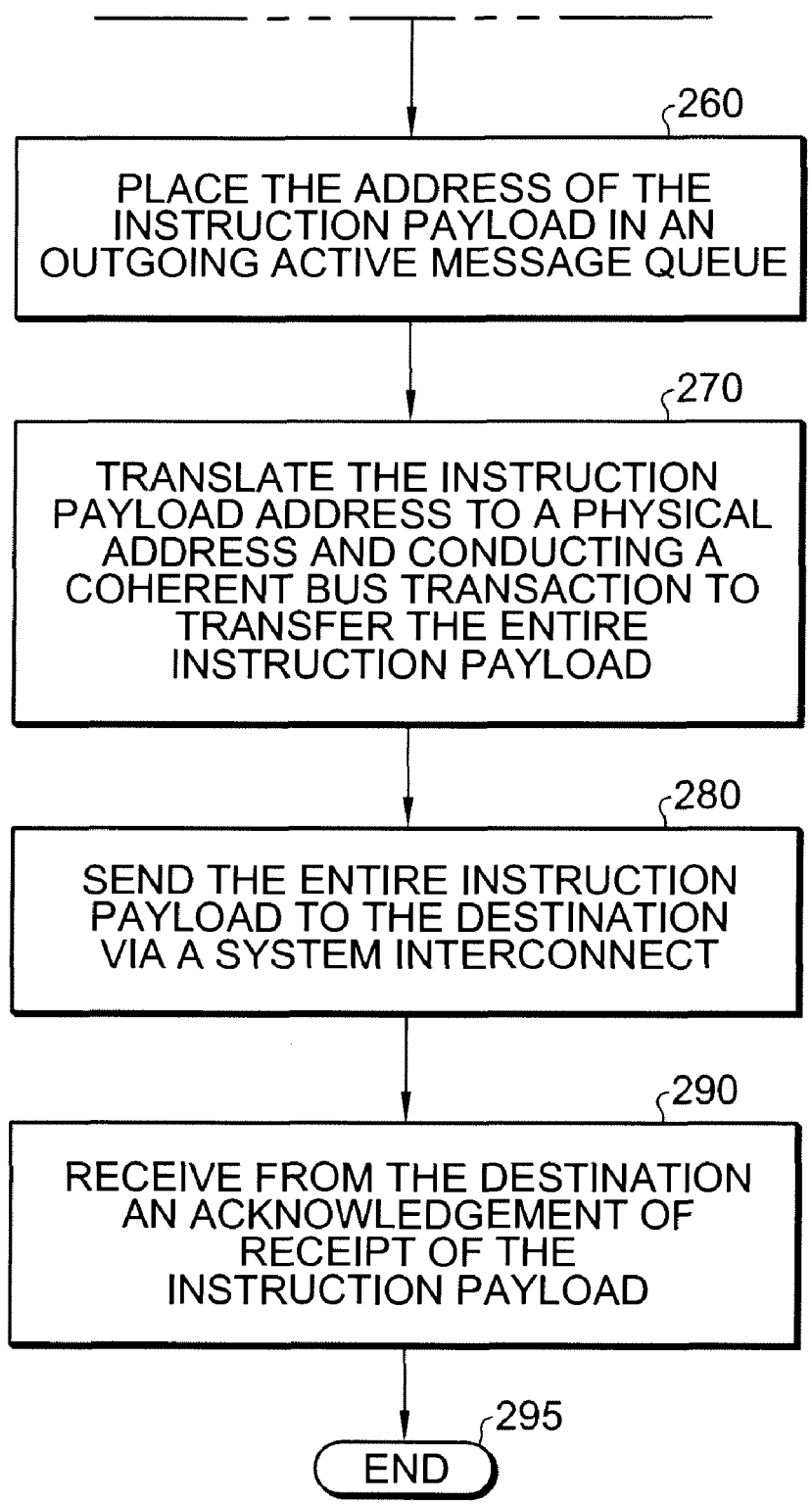
FIG. 2 shows one method embodiment for sending a message to a node in a multiprocessor computing environment using a single direct message.

FIG. 2 shows a flow chart of a method embodiment for conveying data or instructions in a multiprocessor system via a single direct message. Figures and 3 are flowcharts illustrating methods of implementing exemplary processes for sending a message via a single instruction. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

The method begins 205 with receiving 210 a payload of data or instructions from a processor directed to another processor within the system conducting multithreaded processing. Typically the payload is directed to a processor at another node, however, the present invention is equally compatible to the conveyance of messages to processor resident on the same node of a multiprocessor system.

According to one embodiment of the present invention, the physical address of the instruction payload and the virtual address of the destination are written 220 to the scalability interface. The virtual address of the destination of the instruction is translated 230 into a physical address. According to one embodiment of the present invention, this translation of the destination address is accomplished by the processor's translator look-aside buffer. The translation encodes context information such as process, queuing and destination data within the physical address as bit fields. Combining the fields in this fashion enables atomic and single/cycle message sending.

The translation of the destination address and the virtual address of the instruction are thereafter conveyed 240 to the scalability interface associated with the sending processor. The scalability interface extracts 250 from the physical address translation of the destination process information. The process information or context is used by the scalability interface to select an outgoing direct message queue. The virtual address of the instruction, along with destination and queuing information extracted from the destination physical address, are also placed 260 in the selected outgoing direct message queue.

Upon finding a non-empty outgoing message queue, the scalability interface attempts to send items in the queue to the designated destination. The scalability interface, recognizing the virtual address of the instruction, translates the instruction's virtual address to a physical address. Prior to such a sending and according to one embodiment of the present information, the scalability interface pulls the entire instruction payload, sometimes referred to as the cache line, from memory to the scalability interface. Using the physical address of the instruction, the scalability interface conducts 270 a read-to-share (or similar) coherent bus transaction to pull the cache line (payload) from memory or cache to the scalability interface and ultimately to the outgoing message queue.

The payload associated with the instruction is given a transaction identification and thereafter placed on the system interconnect, thus sending 280 the entire instruction to the destination in a single direct message. Shortly thereafter the sending scalability interface receives 290 an acknowledgement from the destination node confirming that the instruction was received ending 295 the process.

Figure 3A:
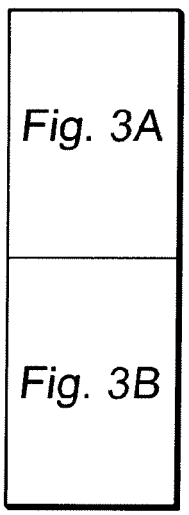
FIG. 3 shows another method embodiment for sending a message to a node in a multiprocessor computing environment using a single direct message.
Figure 3A:
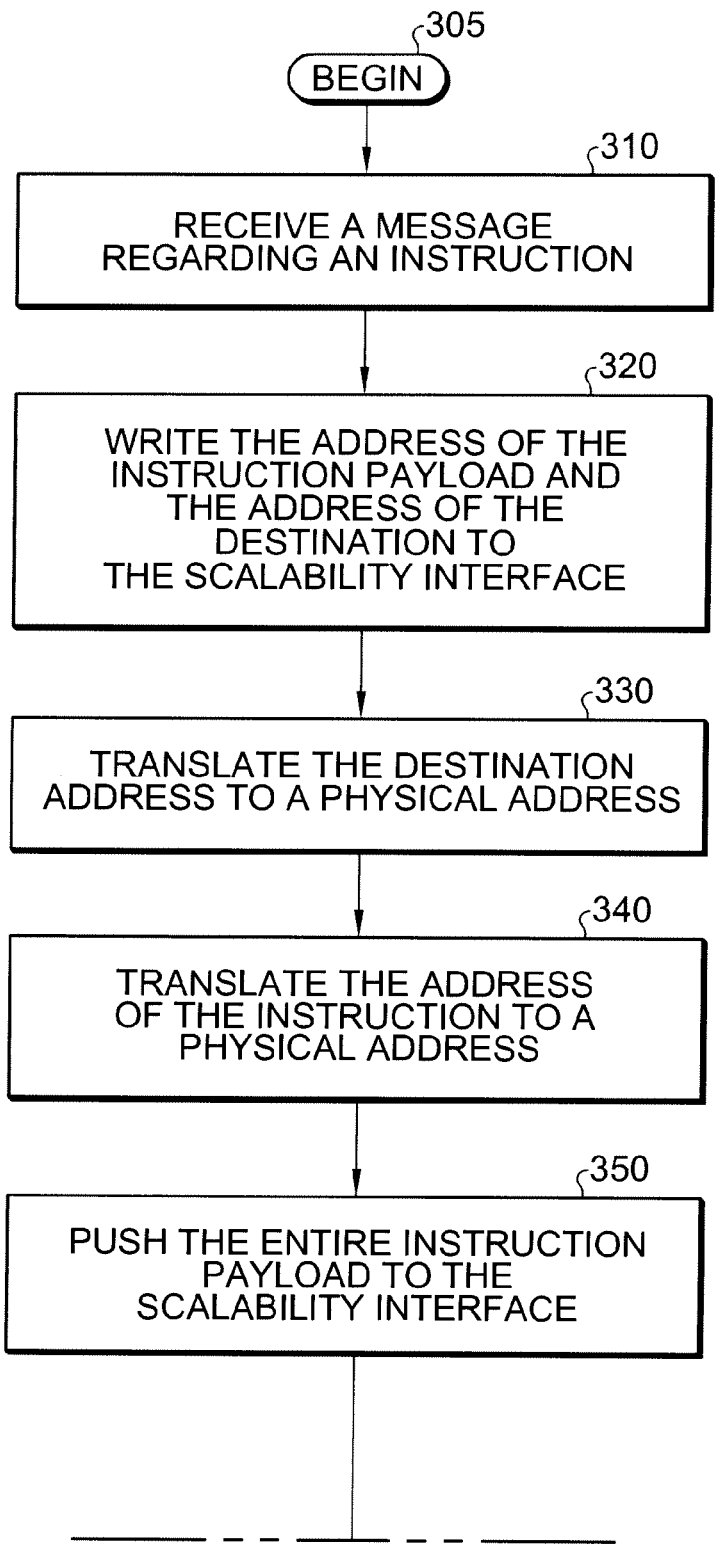
Figure 3B:
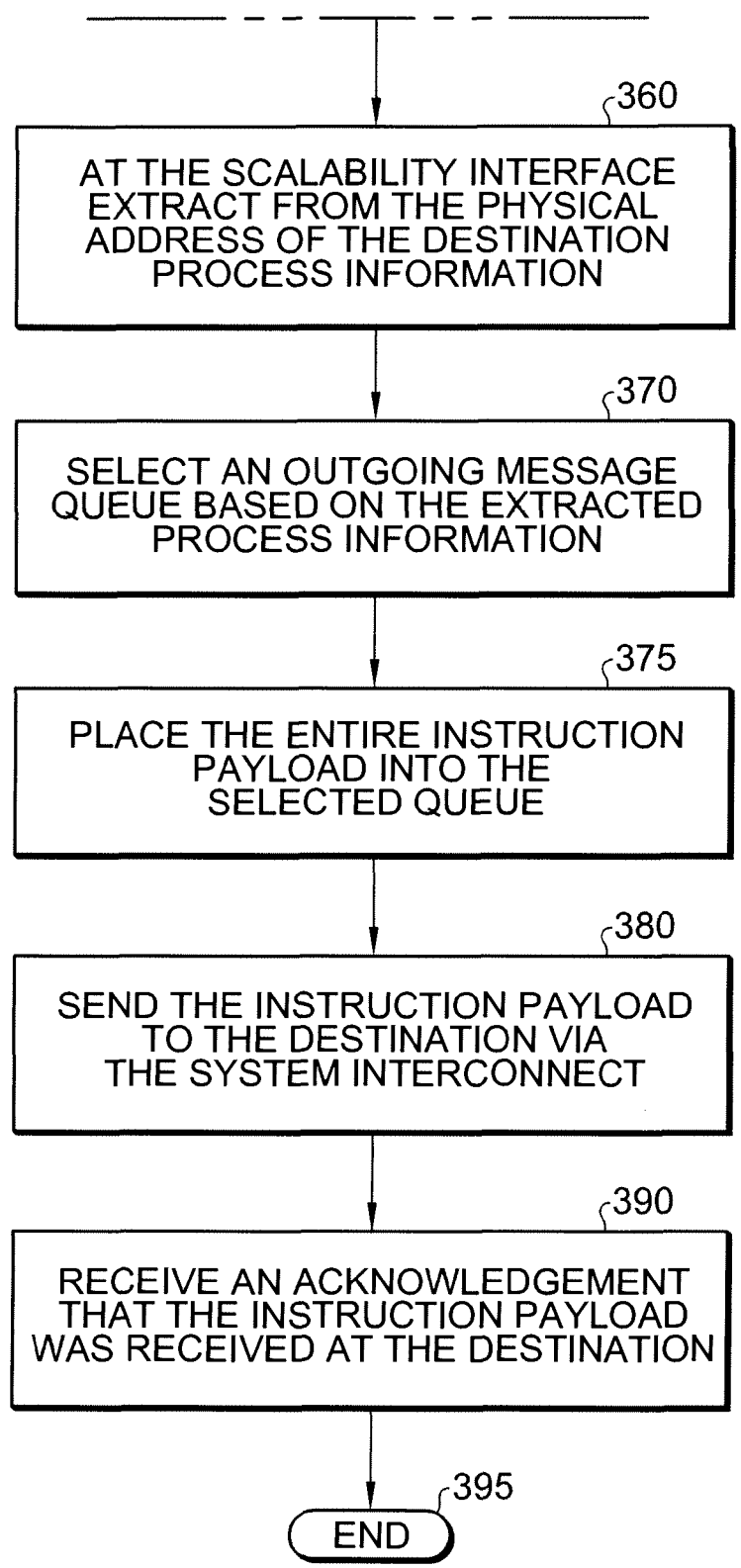

According to another embodiment of the present invention, and as depicted in FIG. 3, an instruction is once again 305 issued by a processor 310 targeting a destination. As before the instruction includes a virtual address of the instruction payload and a virtual address of the destination and is directed 320 to the scalability interface. The virtual address of the destination is translated 330 to a physical address by the processor's translation look-aside buffer. During this translation destination, context informing/identifying the destination, the process, and the queue at the destination is embedded into the address via one or more bit fields.

In this particular embodiment of the present invention the address translation unit of the processor translates 340 the virtual address of the instruction to a physical address and causes the payload of the instruction, the cache line, to be written or pushed 350 to the scalability interface in its entirety. With the payload of the instruction and the physical address of the destination resident on the scalability interface, the interface places the instruction cache line on an outgoing message queue creating a direct message. The outgoing message queue is selected 370 based on information extracted 360 by the scalability interface from the bit fields of the physical address of the destination.

Recognizing an unsent message in an outgoing message queue, the scalability interface places 375 the direct message containing the entire instruction payload on the system interconnect. The message is thereafter sent 380 to the destination node. Upon the message's arrival at the destination, a communication is sent back to the sending scalability interface acknowledging 390 receipt of the message and ending 395 the process.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with specific computer architecture, it is to be clearly understood that the foregoing description is made only by way of example. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived there from.

We claim:

1. A method for sending a payload from a first node to a second node in a multiprocessor system using a single direct message, the method comprising:
   generating at the first node of the multiprocessor system a processor instruction for sending a payload from the first node to the second node in the multiprocessor system using a single direct message between threads of the multiprocessor system, wherein the processor instruction is associated with an instruction address and directed to a location address associated with the second node;
   translating the location address of the processor instruction into a physical location associated with the second node of the multiprocessor system wherein the physical location includes process, destination and queue information of the single direct message;
   translating the instruction address of the processor instruction to a physical address wherein the physical address is associated with the payload;
   conveying the physical address and physical location to a scalability interface of the first node of the multiprocessor system wherein the conveying includes pushing the payload to the scalability interface of the first node of the multiprocessor system;
   extracting, at the scalability interface of the first node of the multiprocessor system, process information from the physical location;
   queuing at the first node of the multiprocessor system the destination information, queue information, and payload as a single direct message for use in message passing between threads of the multiprocessor system in an outgoing message queue, wherein the outgoing message queue is based on the extracted process information; and
   sending the single direct message from the first node of the multiprocessor system to the physical location associated with the second node of the multiprocessor system using message passing between threads of the multiprocessor system.

2. The method of claim 1 wherein the instruction address is a virtual address, wherein the instruction is in the form "send <destination-address> <payload-address>".

3. The method of claim 1 wherein the location address is a virtual location, wherein the first node uses an address translation unit to translate the location address to the physical location.

4. The method of claim 1 wherein the instruction address is translated to the physical address by an address translation unit within the first node, wherein the physical address points to a memory address within a memory of the first node of the multiprocessor system.

5. The method of claim 1 further comprising receiving from the physical location an acknowledgement of receipt of the single direct message.

6. The method of claim 1 wherein sending includes placing the single direct message on a system interconnect, wherein the system interconnects the first and the second nodes.

7. The method of claim 1 wherein an entirety of the payload is disposed in a single cache line during the generating step, wherein the single cache line is the payload.

8. The method of claim 1, wherein the processor instruction is an instruction from a processor instruction set of a processor of the first node of the multiprocessor system.

9. The method of claim 1, wherein a processor at the first node uses a translation look-aside buffer to translate the location address to the physical location.

10. The method of claim 1, wherein translating the instruction address includes conducting a coherent bus transaction of a cache line including process, destination and queuing information associated with the cache line.

11. A parallel computing system comprising:
    a plurality of nodes wherein each node comprises at least one processor, a cache, and a scalability interface; and
    a system interconnect communicatively coupling each of the plurality of nodes, wherein the parallel computing system is operable to perform simultaneous execution of combinations of multiple threads of programmed instructions on multiple processors of multiple nodes of the plurality of nodes, wherein the parallel computing system utilizes direct messaging to perform message passing between individual nodes of the plurality of nodes, wherein the message passing comprises asynchronous, one-way messages between individual nodes of the plurality of nodes, wherein the parallel computing system supports multithreaded applications;

wherein a first node of the plurality of nodes further comprises:

(a) at least one processor of the first node operable to issue a processor instruction associated with a destination address and a payload address;

(b) a payload contained in a line of the cache of the first node;

(c) a translation module configured to translate the payload address to a physical address of the line of the cache of the first node and translate the destination address to a physical location associated with a second node of the plurality of nodes;

(d) a software portion configured to write the payload to the scalability interface_of the first node; and (e) a software portion configured to send the payload to the physical location in a single direct message passed between the first and second nodes of the parallel computing system.

12. The system of claim 11 wherein the physical location includes process, destination and queuing information.

13. The system of claim 11 wherein the translation module is configured to translate the payload address at the at least one processor of the first node.

14. The system of claim 13 wherein responsive to the at least one processor of the first node executing the software portion configured to translate the payload address, the payload is written to the scalability interface of the first node in its entirety.

15. The system of claim 11 wherein the translation module is configured to translate the payload address at the scalability interface of the first node, wherein responsive to translating the payload address at the scalability interface of the first node, the payload is written to the scalability interface of the first node in its entirety.

16. A method for sending a single direct message in a multiprocessor parallel computing system, the method comprising:

(a) issuing, by a first processor of the multiprocessor parallel computing system, an instruction, wherein the instruction comprises arguments, wherein the arguments consist essentially of a destination address and a payload address;

(b) translating the destination address into a physical location wherein the physical location includes process information, destination information and queue information;

(c) translating the payload address into a physical address of a payload in a memory;

(d) writing the payload to a scalability interface;

(e) selecting an outgoing message queue based on the process information;

(f) queuing the payload with the destination information and the queue information in the outgoing message queue, wherein the payload, the destination information, and the queue information are contained within a single direct message; and (g) sending the single direct message to a second processor of the multiprocessor parallel computing system.

17. The method of claim 16, wherein steps (a) through (f) occur at a first node and the second processor is located at a second node.

18. The method of claim 16, wherein an entirety of the payload is contained in a single cache line during step (a), wherein the single cache line is the payload, wherein the translation module, the first processor, and the scalability interface are disposed within a first node, wherein the second processor is disposed within a second node, and wherein the first and second nodes are interconnected to a system interconnect.

19. The method of claim 16, wherein the arguments consist only of a destination address and a payload address.

20. The method of claim 16, wherein the first and second processors perform threads of a multithreaded application.

* * * * *